Dec. 28, 1937.　　A. C. CHRISTENSEN　　2,103,895
MULLER
Filed March 13, 1933　　3 Sheets-Sheet 2

INVENTOR
ALFRED C. CHRISTENSEN.
BY
ATTORNEYS

Dec. 28, 1937.　　　A. C. CHRISTENSEN　　　2,103,895
MULLER
Filed March 13, 1933　　　3 Sheets-Sheet 3
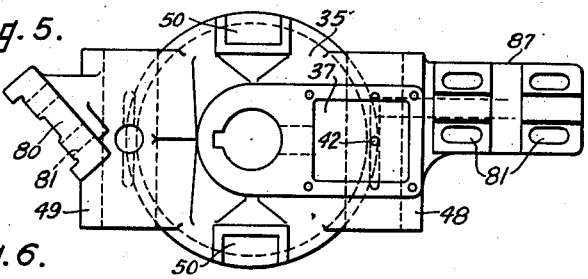
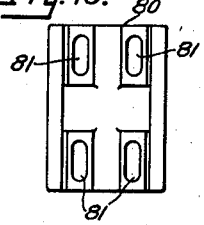
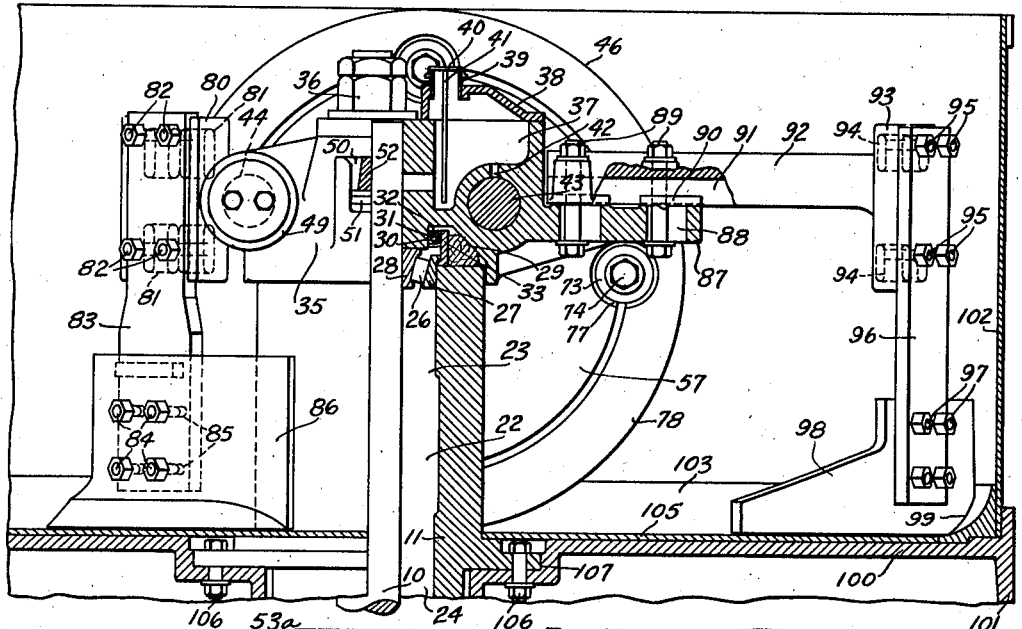
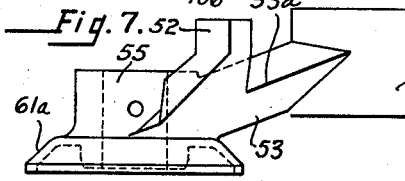
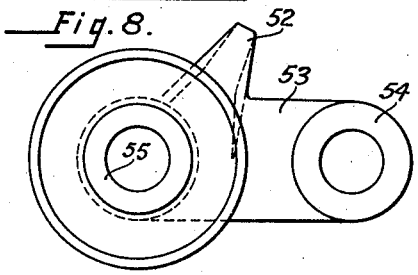
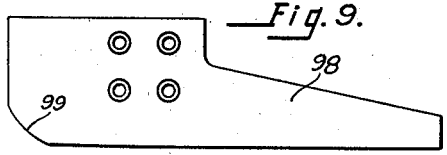
INVENTOR
ALFRED C. CHRISTENSEN.
BY
ATTORNEYS Patented Dec. 28, 1937

2,103,895

UNITED STATES PATENT OFFICE 2,103,895

MULLER

Alfred C. Christensen, Chicago, Ill., assignor to Herbert S. Simpson, Chicago, Ill.

Application March 13, 1933, Serial No. 660,549

4 Claims. (Cl. 83—45)

My invention relates to mullers.

It is the object of my invention to provide a system of lubrication in a muller which is subjected to dust, grit and sand conditions so that there will be a positive automatic oiling of all of the principal bearings of the machine from a common source either by pressure or by gravity to insure the lubrication of all parts of the machine without the special attention of the operator.

It is a further object to provide such a system of lubrication that the movements of the lubricant will always be outwardly from the bearings to prevent the entrance of foreign material and to provide in combination therewith resilient, lubricant-saturated seals, which will automatically adjust themselves to maintain a constant lubricated sealed condition to prevent the entrance of foreign materials into the bearings of the machine.

It is a further object to provide a successive series of such seals so that, in the event any foreign material should creep by a portion of the seals, it will be stopped by other portions.

It is a further object to provide a muller in which a vertical shaft bearing adjustment is located at the top of the cross head insuring proper bearing adjustment without dismantling any part of the machine.

It is a further object to provide a removable, sectional fillet in the corner of the crib and wear plate to prevent sand from building up and wearing the plow point excessively.

It is a further object to provide muller wheels having tires detachably wedged on the wheels thereby permitting of reversal of the tires as they wear.

It is a further object to provide positive outside plow adjustment to compensate for wear on the plow without changing the original angle of the plow, the adjustments being only out toward the crib and downwardly toward the wear plate.

It is an object to provide a cross head and rocker arms to efficiently shed any sand away from the lubricated bearings.

It is a further object to provide a detachable hub for the driving gear so that a complete assembly of the vertical shaft and turret can be made outside of the mixer and the insertion thereof can be made from the top of the bed plate.

It is a further object to arrange the mullers in a retarded position behind the center line of mill to cause the mullers to rotate more freely and to arrange the leverage of the rocker arm so as to prevent the sticking of the pivot shaft.

It is a further object to provide a shim construction for limiting the downward movement of the muller so that, by removal of the shims, adjustments can be made in accordance with the wear on the muller wheel without the necessity of using screws that corrode and stick and on which it is difficult to get a fine adjustment.

It is a further object to provide a composite unit of speed reduction and power drive within the limits of the muller dimensions.

Referring to the drawings:

Figure 3 is a side elevation of the outer scraper arm looking at the arm from the right hand side in Figure 1;

Figure 4 is a section on the line 4—4 of Figure 1;

Figure 5 is a top plan view of the muller drive head or spider on top of the driving shaft and column in the center of the muller;

Figure 6 is a section on the line 6—6 of Figure 1 showing in elevation the muller mechanism and in particular the scraper and plows;

Figure 7 is a top plan view in detail of one of the muller arms showing the streamline characteristics for shedding sand;

Figure 8 is a side elevation of Figure 7 looking in the direction from the bottom of Figure 7;

Figure 9 is a side elevation from the outer scraper or plow;

Figure 10 is a front elevation of the attaching face shown in a diagonal position on the left hand of Figure 5 for the inner scraper arm;

Figure 11 is a front elevation of the exterior of the muller wheel showing the four attaching bolts for the tire on the wheel.

Figure 2:
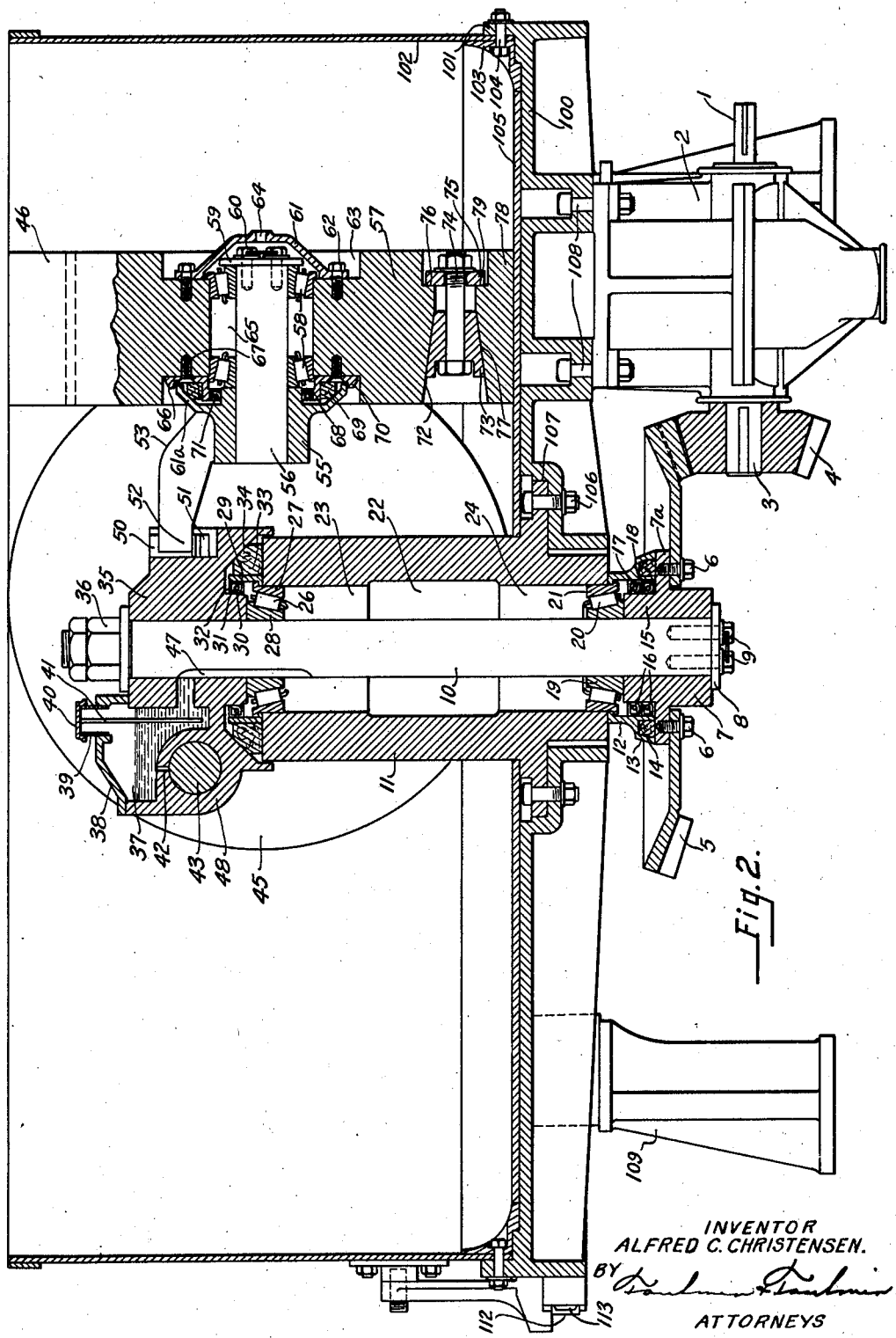
Figure 2 is a section on the line 2—2 of Figure 1.

Referring to the drawings in detail, 1 indicates a driving shaft from a suitable source of power, such as an electric motor. This drive shaft is mounted in a speed reducing unit 2, the driven shaft of which is indicated at 3 carrying the beveled pinion 4 meshing with the beveled gear 5 (Figure 2).

One of the features of the invention is the mounting of this beveled gear detachably by the bolts 6 upon a hub 7 in such a manner that the entire gear can be removed without disturbing the assembly of the remainder of the muller drive. The bottom of this hub is engaged by the plate 8 retained in position by the bolts 9 on the bottom of the vertical muller shaft 10 which is located within the hollow column 11. The hub 7 which has the flange 7a, to which is bolted by the bolts 6 the gear 5, acts as a support for an oil seal ring 12 extending from the flange 7a to the bottom of the column 11. In a skirt 13 of this seal ring is a felt seal 14 that is supplied with lubricant as hereinafter described. Between the inside of this skirt 13 and a collar 15 of the hub 7 is a pair of leather seals 16 held in position by springs 17 within cages 18. Above and resting upon this hub is the inner race 19 for a plurality of roller bearings 20, the outer race for which 21 engages with the inner wall at the lower end of the column 11 and interlocks with a shoulder on the top of the ring 12 thus tying the whole structure together.

Within the column 11 is a chamber 22 which may be filled with lubricant, if desired, or may be filled with plain bearings in the spaces 23 and 24 in the event that the roller bearings herein described are not employed.

The roller bearings 26 at the top of the column 11 have an outer race 27 and an inner race 28. The outer race rests upon and engages with a collar 29 which has on the inside a leather seal 30 with a spring 31 and cage 32 and on the outer side is a pair of felt rings 33 which are compressed as shown by the depending diagonal flange 34 on the spider or driving head 35 which rests on top of the inner race 28. This spider or head 35 is retained on the shaft 10 by the nuts and washers generally designated 36.

Formed in the spider or driving head 35 is a chamber 37 containing lubricant enclosed by a cover 38 and having a detachable pipe 39 with a cover 40 having a telltale lubricant measuring rod 41 formed as a part thereof. The lubricant in this reservoir has access through the passageway 42 to the shaft 43 and the shaft 44 which are the axle shafts for the muller wheels 45 and 46 respectively.

Thus, these axles are lubricated at a convenient place at the top of the machine by either gravity or under pressure. This same reservoir supplies lubricant through the passageway 47 to the upper bearings 26 and thence downwardly to the lower bearings 20 through the chamber 22. The lubricant being under gravity tends to move downwardly and outwardly carrying with it any foreign materials such as dust, grit or sand, and thoroughly saturates the felt seals and leather washers in order to maintain a plurality of successive oil-saturated, tight joints to prevent foreign material getting into the bearings.

All that the operator has to do to lubricate is to place lubricant in the reservoir 37 by gravity and this insures a continuous supply of lubricant.

The spider head 35 which carries the axles 43 and 44 in the sleeves 48 and 49 is provided with laterally disposed open top chambers 50 in which there are a plurality of shims 51 supporting the limit arm 52 which limits the extent of downward movement of the muller 45 or 46. When it is desired to adjust the downward movement a shim is removed.

It will be further noted that the mullers are carried in bracket arms 53 and 53a which carry the arms 52. One end of each arm 53 and 53a is formed in a sleeve 54 mounted on one of the axles 43 or 44 and the other is formed into a sleeve 55 carrying a muller axle 56. The axis of the muller axle 56 is retarded past the center line of the mill thereby retarding the mullers and causing them to rotate more freely.

The muller itself is composed of a muller wheel 57 mounted on spaced bearings 58 on the axle 56 which are retained by the plate 59 and bolts 60 in position. The outer bearing and end of the axle is covered by a cover plate 61 detachably mounted by bolts 62 in a recess 63 in the wheel 57. Lubricant is supplied to the bearings through the port 64 in the plate 61. These bearings are mounted in a chamber 65 within the wheel 57 which can contain the necessary lubricant. The rear end of this chamber is sealed by a detachable right angle plate 66 held in position by the screw bolts 67 on the muller wheel 57. The angular portion or collar 68 of this closure plate forms a receptacle for an annular felt seal 69 which is forced into position by the skirt 61a on the sleeve 55, the inner end of the skirt interlocking with a flange 70 on the plate 66. The inside of the collar 68 is provided with a spring pressed leather seal 71 for further retention of the lubricant and the exclusion of foreign material. The exterior of the wheel 57 has a tapered face 72 engaging with a plurality of tapered wedge blocks 73 held in position by bolts 74 and clamping plates 75 engaging a shoulder 76 on the periphery of the wheel 57. These wedge blocks 73 and clamping plates 75 engage respectively an inner tapered surface 77 of a muller tire 78 and a recessed shoulder 79 on the tire. In this manner the tire is detachably mounted by a plurality of bolts (in this case four in number) so that, when the outer face of the tire wears, it may be quickly detached and reversed. This saves in first cost and reduces the cost of maintenance of the surface of the muller wheel.

The muller arms 53 are provided with ridges 53a (Figure 7) in order to streamline them so that the sand will fall off of the arms and not accumulate thereon and thereby work its way into the bearings as to which the foregoing precautions are taken so as to protect them.

As the sand cannot adhere and what little dust remains is excluded I provide the maximum safety for the bearings in this muller machine.

The spider 35 is provided with a vertical diagonally-disposed attaching plate 80 having a plurality of elongated slots 81 in which are located the adjusting bolts 82 (Figures 5 and 6) for vertically adjusting the inner plow arm 83, the lower end of which is connected by bolts 84 into slots 85 in the plate 83 to permit of the lateral adjustment of the inner plow 86.

The spider also is provided with a laterally-extending slotted bracket 87 having slots 88 for receiving the adjusting bolts 89. In the upper face of this bracket 88 is a radially-disposed groove 90 for receiving a corresponding rib 91 (Figure 6) on the bottom of the outer plow arm 92 to guide it in its inner and outer movement when adjusted by the bolts 89. The outer end of the arm 92 is provided with a vertically-disposed attaching adjusting plate 93 having slots 94 receiving bolts 95 for retaining the outer plow arm 96 in adjusted vertical position. This plow is adjusted by bolts 97 and is designated 98. It has a round face 99.

The muller pan consists of a bed plate 100 having an annular flange 101 which supports a side wall 102 and an interlocking removable sectional fillet 103 retained in position by the bolts 104. Inside this fillet are the wear plates 105 which cover the bolts 106 attaching the column 11 in a recess 107 in the bed plate 100. To the bottom of this bed plate is attached by the bolts 108 the gear housing 2. This plate 100 is supported by the legs 109.

Figure 1:
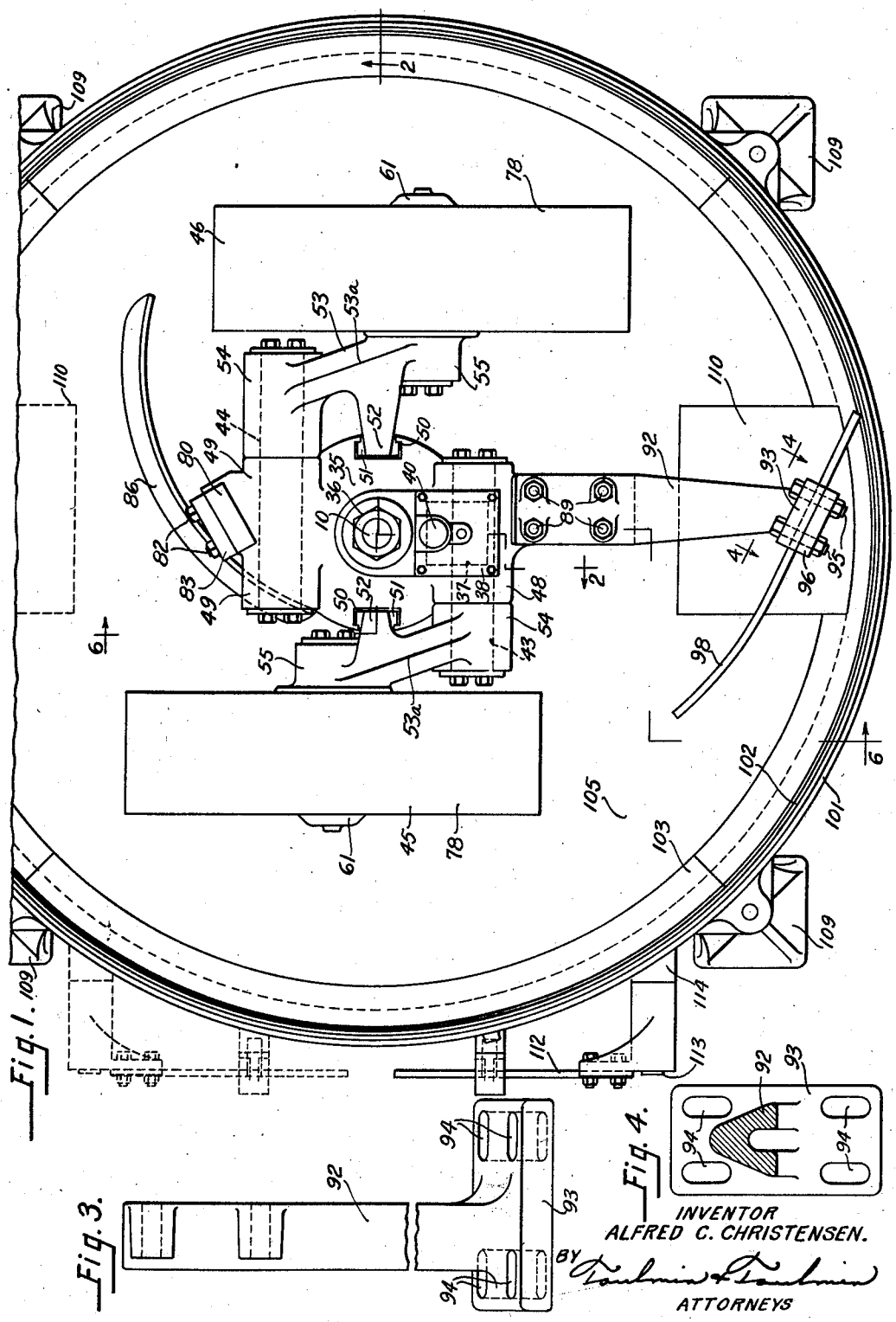
Figure 1 is a top plan view of the muller.

The bottom 100 is provided with a door 110 that is suitably actuated by the lever 112 through the shaft 113 operating in the sleeve 114. This door may be positioned either as indicated in full lines in Figure 1 or in dotted lines, or there may be two doors.

It will be understood that I desire to comprehend within my invention such modifications as may be necessary to adapt it to varying conditions and uses.

Having thus fully described my invention, what I claim as new and desire to secure by Letters Patent, is:

1. In combination, a muller pan, having bearings muller means, a muller means driving shaft in the bearings, a spider on the upper part of said shaft, for connecting said shaft to said muller means, a lubricant reservoir in said shaft spider, and means for connecting said lubricant reservoir with the inner sides of said bearings whereby to lubricate the connection of the muller means to the spider and the bearings for the shaft in the muller pan, said lubricant reservoir being connected to direct lubricant outward from said bearings toward the joints between the rotating parts and their supports.

2. In combination, a muller pan, having bearings muller means, a muller means driving shaft in the bearings, a spider on the upper part of said shaft, for connecting said shaft to said muller means, a lubricant reservoir in said shaft spider, and means for connecting said lubricant reservoir with the inner sides of said bearings whereby to lubricate the connection of the muller means to the spider and the bearings for the shaft in the muller pan by gravity, said lubricant reservoir being connected to direct lubricant outward from said bearings toward the joints between the rotating parts and their supports.

3. In combination, in a muller, a muller pan, muller wheels in the pan, a muller driving shaft, a muller spider having a reservoir therein pivotally supporting said muller wheels and connected to said driving shaft, a column for supporting said spider, bearings between said shaft and said column, and means of communicating lubricant to said bearings from said reservoir and to the pivotal supports for said mullers, packing supported on the top of said column, additional packing supported on said spider and a collar located between and in contact with both of said packings.

4. In combination, in a muller, a muller pan, muller wheels in the pan, a muller driving shaft, a muller spider having a reservoir therein pivotally supporting said muller wheels and connected to said driving shaft, a column for supporting said spider, bearings between said shaft and said column, means of communicating lubricant to said bearings from said reservoir and to the pivotal supports for said mullers, and lubricant-saturated means adapted to seal the joints between said column and said spider to prevent the entrance of foreign material thereto, certain of said lubricant saturated means including a packing supported by said spider, a packing supported on the stop of said column and a collar located between said packings and supported in place on said collar, certain of said bearing means being in contact with said collar and preventing movement of the same.

ALFRED C. CHRISTENSEN.